United States Patent [19]

Li

[11] Patent Number: 5,689,162
[45] Date of Patent: Nov. 18, 1997

[54] APPARATUS AND METHOD FOR CURRENT SENSING FOR MOTOR DRIVER IN PWM MODE

[75] Inventor: Larry B. Li, Plano, Tex.

[73] Assignee: SGS-Thomson Microelectronics, Inc., Carrollton, Tex.

[21] Appl. No.: 477,193

[22] Filed: Jun. 7, 1995

[51] Int. Cl.[6] .................................................. G05B 11/28
[52] U.S. Cl. .......................... 318/599; 318/254; 318/138; 318/439
[58] Field of Search .......................... 318/599, 254, 318/138, 439, 798–815, 636

[56] References Cited

U.S. PATENT DOCUMENTS

| | | |
|---|---|---|
| 4,471,283 | 9/1984 | Presley .................................. 318/798 X |
| 5,017,845 | 5/1991 | Carobolante et al. . |
| 5,172,036 | 12/1992 | Cameron . |
| 5,191,269 | 3/1993 | Carobolante . |
| 5,191,270 | 3/1993 | McCormack . |
| 5,204,594 | 4/1993 | Carobolante . |
| 5,221,881 | 6/1993 | Cameron . |
| 5,223,772 | 6/1993 | Carobolante . |
| 5,293,445 | 3/1994 | Carobolante . |
| 5,294,877 | 3/1994 | Cameron . |
| 5,306,988 | 4/1994 | Carobolante et al. . |
| 5,309,078 | 5/1994 | Cameron . |
| 5,317,243 | 5/1994 | Cameron . |
| 5,329,560 | 7/1994 | Rastegar et al. . |
| 5,346,545 | 9/1994 | Bahr et al. .......................... 318/811 X |
| 5,350,984 | 9/1994 | Carobolante et al. . |
| 5,374,857 | 12/1994 | Carobolante . |
| 5,420,492 | 5/1995 | Sood et al. .......................... 318/809 |
| 5,457,375 | 10/1995 | Marcinkiewicz et al. ........... 318/802 |
| 5,506,743 | 4/1996 | Philips ............................... 318/798 X |

*Primary Examiner*—Karen Masih
*Attorney, Agent, or Firm*—Theodore E. Galanthay; Lisa K. Jorgenson; Gordon H. Telfer

[57] ABSTRACT

A motor drive control circuit for operation in the PWM mode includes a feedack circuit from a resistor for sensing motor coil current modified to switchably connect the resistor to the drive input in accordance with operation of a sample-hold switch. The sample-hold switch is controlled to sample a signal proportional to motor coil current only at the middle of the coil current rise during each PWM ON time, thus providing a reliable indication of average coil current. A signal storage capacitor connected in the feedback circuit receives the sampled signal and retains it for use in feedback control throughout PWM operation until the next sample.

18 Claims, 3 Drawing Sheets

APPARATUS AND METHOD FOR CURRENT SENSING FOR MOTOR DRIVER IN PWM MODE

BACKGROUND OF THE INVENTION

1. Field of the Invention

The present invention relates generally to motor circuits and particularly to pulse width modulation (PWM) motor drive circuits in which motor coil current is sensed for control purposes.

2. Description of Related Art

PWM techniques are known for use in motor drives. The exciting coils of a motor are supplied drive pulses rather than continuous excitation, thus reducing power dissipation. Between drive pulses, the coils continue to conduct, and satisfactory motor operation can be maintained, with reduced current flow in the coils.

There is growing interest in applying PWM drives to operate brushless, direct current, motors used to drive hard disks and other rotating data storage media in computers. Such motors are sometimes referred to as spindle motors. Such applications require monitoring motor operation substantially continuously and controlling the motor, through the motor driver, to achieve desirable characteristics such as maximum torque, rapid acceleration and consistent speed. PWM drives require careful control in such applications because the pulsed nature of the drive excitation produces transients at the beginning and at the termination of pulses. In some systems, there may be intervals of operation in a linear mode as well as operation in a PWM mode because the linear mode has characteristics favorable for certain functions such as speed control. Use of the PWM mode is desirably maximized for power reduction, with measures taken to achieve satisfactory control during the entire time of PWM mode operation.

Sensing the coil current is important in PWM drives for control purposes. In a typical PWM drive system, reliable current sensing is impaired because of the nature of some of the drive components. The drive components generally include a transistor switching bridge connected between a DC voltage supply and ground. The bridge has conduction paths through an upper transistor to one or more motor coils and then to a lower transistor that has one side connected to a sense resistor that is grounded. The sense resistor is to provide a signal proportional to coil current to a feedback loop that goes back to control components of the PWM drive. The switching transistors are often integrated in a common chip whose body or substrate is grounded. The integration of the transistors causes intrinsic diodes to be formed in known ways that may cause conduction to occur under certain conditions that is unintended and undesired.

In the applications of particular interest, it is common to utilize switching transistors that are field effect transistors of the known power D-MOS type. In the form of bridge referred to, the lower transistors are subject to conduction through the intrinsic diode to ground during part of PWM mode operation. That may occur when an upper transistor is going off and the lower transistor in the same conduction path is still on. When that happens, current presented to the sense resistor is substantially less than true coil current.

The problem of interruption of reliable current sensing has resulted in several different proposed techniques to alleviate that problem.

These include utilizing different types of transistors in the transistor bridge which would operate in the saturation region of their characteristic curve, rather than the triode region, so the error in sense current is reduced. Such sense field effect transistors are known. They are, however, subject to process variations in their manufacture that would introduce other variations in performance.

Another technique involves use of three sense resistors, one for each path of a three path switching bridge. Intrinsic diode conduction could still affect other device performance even if current sensing were improved. In an integrated circuit, the precise matching of three resistors would also be a problem.

It has also been suggested to use a Schottky diode in each of the three conduction paths. Such devices may alleviate the current sensing problem but create other problems during motor startup or running at high current level. Also, provision of such devices would be relatively expensive and would require additional pins on the circuit.

A further proposed way of getting better current sensing is to have a low pass filter in the feedback loop from the sense resistor to control elements of the PWM drive. This approach is subject to an instability problem in the current control loop and will, also, require an additional pin on the circuit.

Consequently, previously proposed techniques for trying to improve current sensing have had drawbacks of complexity, cost, or creating other problems.

SUMMARY OF THE INVENTION

Recognizing the above-mentioned problem and the drawbacks of the variously known solutions, there is now provided a way to obtain good current sensing during the entire time of PWM mode operation with a relatively simple, reliable and easy to implement additional circuit portion to the feedback loop.

The apparatus and method of the invention generally requires merely that the coil current be sampled only at a time in the middle of the PWM pulse duration when a reliable average current can be obtained. The sampled average current signal is held and used as a feedback signal throughout PWM operation, even during intervals between the PWM pulses. The sampled average current signal is available to the feedback loop during times when transients or the above described intrinsic diode conduction would not allow the sense resistor to develop a signal accurately representing the coil current The technique may be implemented, for example, by providing, in combination with the coils, PWM drive circuit, and sense resistor, additional elements to the feedback loop. The feedback loop normally includes a sense amplifier for receiving voltage signals from the sense resistor that are proportional to coil current. The added elements include a signal storage capacitor connected to an input to the sense amplifier and a sample-hold switch between that capacitor and the sense resistor. The sample-hold switch is controlled, by timing pulses coordinated with those for the PWM drive, to sample the voltage appearing across the sense resistor at a time at the middle of a coil current rise due to a PWM drive pulse. At that time, the sense resistor voltage accurately indicates average coil current. The capacitor holds the charge from the sampled signal for application to the feedback loop, such as the sense amplifier, throughout the rest of the PWM operation until the next sampled signal. Consequently, any transient effects, including intrinsic diode conduction, that could impair reliable control are avoided. The benefits of the invention make it more practical to use PWM techniques to run, as well as start, motors such as computer disk drive motors.

The invention may, but need not, be used in combination with other modifications to a PWM drive to minimize effects of PWM transients including modifications for reducing or eliminating transients in transitioning between PWM mode operation and linear mode operation when a drive is operated sequentially in each of the two modes.

DESCRIPTION OF THE PREFERRED EMBODIMENTS

Figure 1:
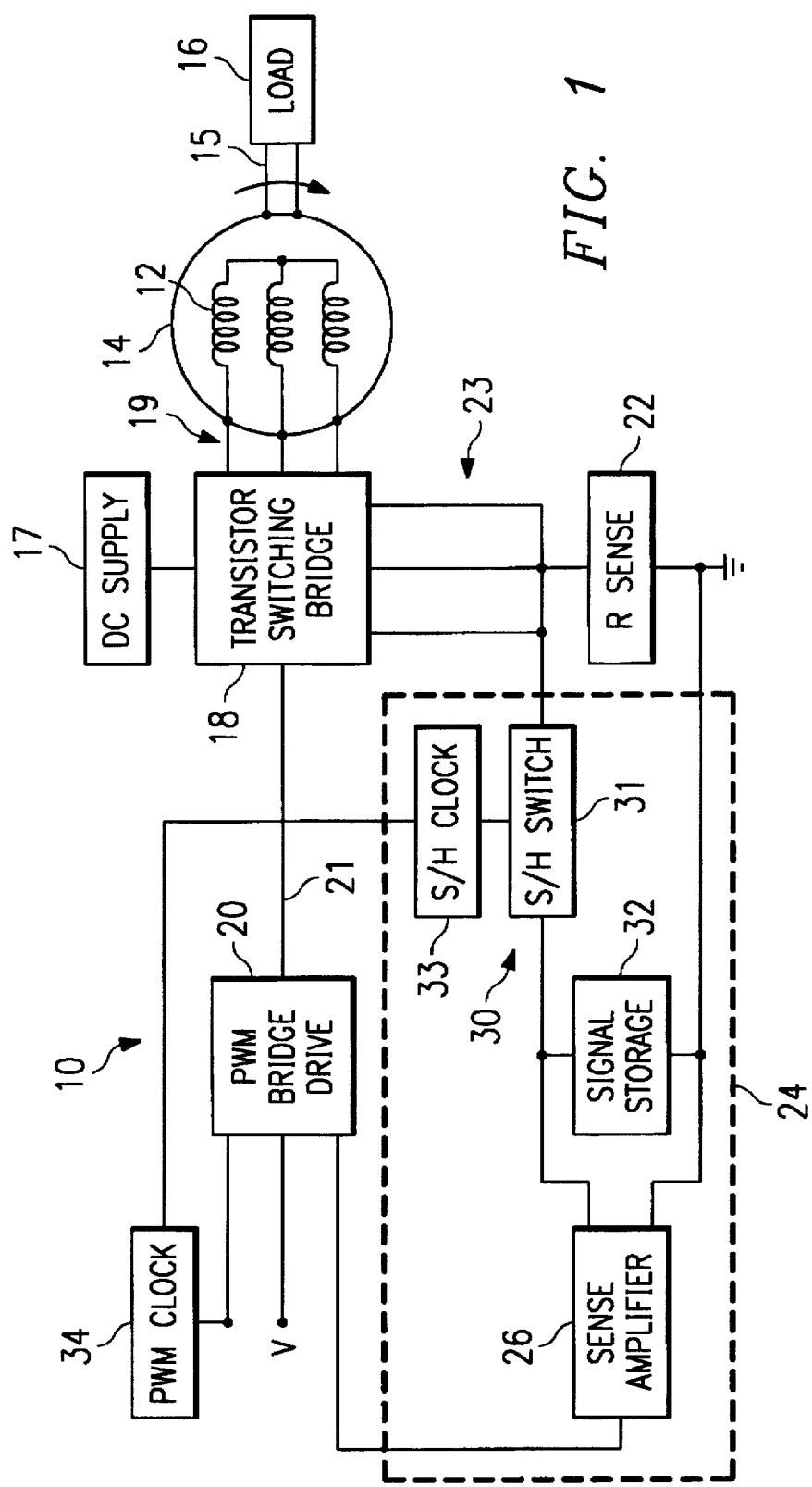
FIG. 1 is a schematic block diagram of a PWM motor drive system with a general illustration of an example of the present invention.

A PWM motor drive control system with improved current sensing capability in accordance with this invention is illustrated in simplified form in FIG. 1. A drive circuit 10 is here shown for supplying energizing current in pulses, such as by known pulse width modulation (PWM) techniques, to coils 12 of a motor 14 which may, for example, be a three-phase direct current motor. Motor 14 has a rotating shaft 15 driving a mechanical load 16 which may be, for example, disks in a computer disk drive. In this example, drive circuit 10 includes a DC supply 17 for supplying a voltage to a transistor switching bridge 18 that is under the control of a PWM bridge drive control circuit portion 20.

Operation of the transistor bridge 18 may be in accordance with known practice. The single line 21 shown between the bridge drive 20 and the bridge 18 represents a plurality of paths of multiplexed or sequentially commutated signals for operating respective transistors in the bridge.

The three lines 19 between bridge 18 and coils 12 represent connections of coil pairs of coils 12 to respective points between upper and lower transistors (not here illustrated) of the bridge. The bridge 18 provides three conduction paths 23 from the lower transistors of the bridge to a sense resistor (R Sense) 22, which also has a reference potential, or ground, connection.

The sense resistor 22, also in accord with known practice, develops a signal proportional to coil current. That signal is intended for application to a feedback circuit portion 24, such as may include a feedback or sense amplifier 26, as previously connected back to the PWM drive 20 so the sensed current can be utilized in control of the system.

FIG. 1 further includes as part of the feedback circuit 24 a subcircuit 30 for sampling and storing a signal representing coil current at a time when a PWM pulse is at the middle of its duration and the coil current is at the middle of its rise during the PWM ON time.

In this example, subcircuit 30 includes a sample/hold switch 31 and a signal storage device 32 connected between the sense resistor 22 and the sense amplifier 26. The sample/hold switch 31 is operated by a clock 33 to cause the switch to close at the above-described times to sample the signal at the sense resistor 22 and almost immediately thereafter open the switch. That is, the clock 33 has a time constant for closing switch 31 that is quite short compared to the duration of a PWM pulse. PWM clock 34 is shown connected to apply PWM clock signals to the drive 20 and to the S/H clock 33.

The storage device 32, such as a capacitor, holds a charge representing the sampled average current and supplies a corresponding voltage to the feedback amplifier 26 throughout PWM operation as a reliable indication of average coil current even during periods of operation when PWM transients, including intrinsic diode conduction from any of the transistors in bridge 18, impairs the accuracy of the current sensed by the sense resistor 22.

After clock 33 opens switch 31, the sampled average current signal is held on storage device 32 until sampling occurs at the mid-point of the next PWM pulse.

FIG. 1 is also illustrative of a process or method of operating a PWM motor drive system for deriving average coil current for control purposes throughout operation, both during and between drive pulses. The method includes sensing and developing a signal proportional to coil current, such as by sense resistor 22, sampling that signal at a time at the middle of a PWM drive pulse, such as by the sample/hold switch 31 controlled by clock 33, to derive a sampled average current signal, holding the sampled signal, such as in the signal storage device 32, and applying the sampled signal as a feedback signal, such as by connection of the storage device 32 with feedback or sense amplifier 26, throughout PWM operation.

Figure 2:
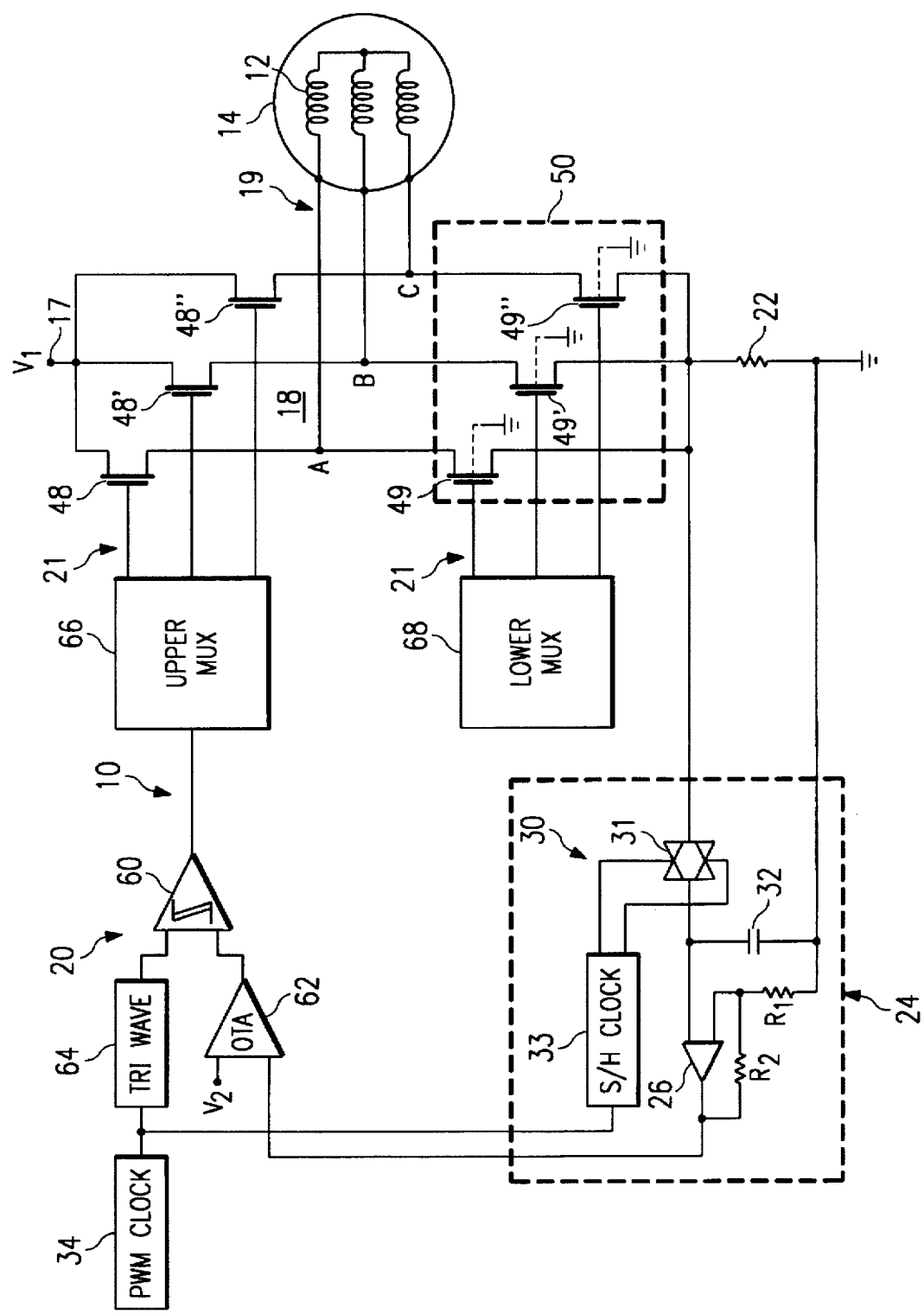
FIG. 2 is a schematic circuit diagram further illustrating an example of the present invention.

FIG. 2 illustrates a further example of an embodiment of the invention with a number of elements given reference numerals corresponding to similar elements of FIG. 1.

FIG. 2 shows some basically standard components of a PWM motor drive system including a drive circuit 10 connected to stator coils 12 of a motor 14, which are in a Y configuration, at coil nodes A, B, and C. Motor 14 would typically have a permanent magnet rotor (not shown). A DC supply 17 Or $V_1$ supplies a voltage to a power stage in the form of a transistor switching bridge 18 which in this example is a conventional H-bridge, commonly referred to as a triple-½-H-bridge, as shown. The bridge 18 includes three upper transistors 48, 48' and 48" connected between supply 16 and respective nodes A, B and C. The bridge 18 also includes three lower transistors 49, 49' and 49" connected between the respective nodes A, B and C and a common connection with sense resistor 22.

Operation of bridge 18 to energize coils 12 is in accord with known practice and will not be detailed. However, it is noted for understanding the invention that the lower transistors 49, 49' and 49", are significant in the respect they link the motor coils 12 with the sense resistor 22 and the sense resistor receives current proportional to coil current subject to the conduction characteristics of the transistors.

The transistors 48, 48' and 48", 49, 49', and 49" are power field effect transistors generally integrated in a chip on a common substrate and may be of the D-MOS FET type. Such a chip 50 is schematically shown, in part, as containing the lower transistors 49, 49' and 49". As described in the background above, such transistors are characterized by having intrinsic diodes (here represented, for example, as respective ground connections drawn in dashed lines from the transistors 49, 49' and 49" on substrate or chip). It is primarily to obviate the effects of intrinsic diode conduction during PWM operation that the present invention is provided. If an intrinsic diode receives a forward bias, coil current intended by the circuit design to be conducted through the sense resistor 22 to ground will instead be conducted through the diode to ground. In the latter case, the sense resistor 22 cannot give a signal representing coil current.

For the purposes of this example, although the particular form is not critical to this invention, PWM circuit portion 20 of FIG. 2 is shown including a comparator 60 receiving an input from an operational transconductance amplifier (OTA) 62 and another input from a triangle wave generator 64 which is, in turn, coupled to a PWM clock 34. The OTA 62 receives an input from a second voltage supply $V_2$ and another input from the feedback circuit 24. Basically, the comparator 60, OTA 62, tri-wave generator 64, and PWM clock 34, with possible additional elements, determine the application of PWM drive pulses to the gates of the transistors of the bridge 18 in a known multiplexing manner such as by an upper multiplexer 66 connected to the upper transistors and a lower multiplexer 68 connected to the lower transistors. (Input to lower multiplexer 68 is not shown in FIG. 2).

More central to an understanding of the present invention is the content of the feedback circuit portion 24.

The circuit portion 24 includes a sense amplifier 26 which is an operational amplifier connected as shown with its related input and feedback resistors $R_1$ and $R_2$ in a generally known manner. In addition, the feedback circuit 24 is shown with a subcircuit 30 for sampling and storing a signal representing coil current when the coil current is at a middle point during the ON time of a PWM drive pulse. By operation of subcircuit 30, that signal is held during the rest of the ON time, all of the PWM OFF time, and until the next sampling occurs when the coil current is at the next succeeding middle point of the coil conduction during a PWM pulse.

The sample and hold circuit 30 includes a capacitor 32 connected at an input to amplifier 26 and arranged to be charged by voltage across the sense resistor 22. However, the effect of the sense resistor voltage is limited to the desired time of average coil current, referred to above, by the operation of sample/hold switch 31 as controlled by clock 33.

By way of further explanation of the example embodiment, the middle point of the ON phase of PWM operation is at the lowest point of the triangular wave form produced by the tri-wave generator 64 supplied to the comparator 60. That is the rising edge of the PWM input clock timing signal.

The storage capacitor 32 is of appreciable value, such as about 10 to 20 picofarads. That is to ensure retention of the sampled signal for a sufficient time until the next sampled signal.

Sample/hold switch 31 may be of a known type including n and p channel MOS elements respectively receiving one of the two outputs from the clock 33.

Figure 3:
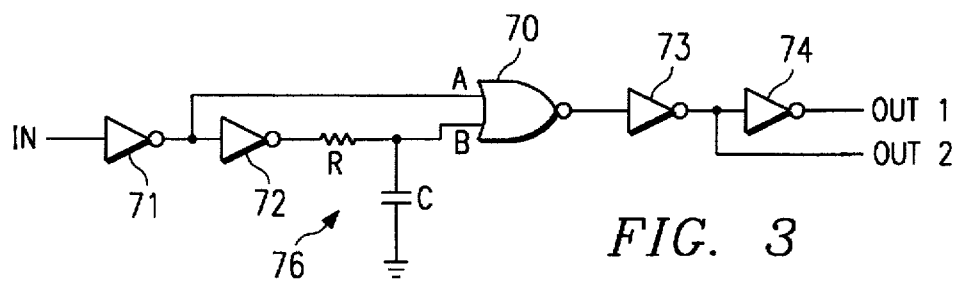
FIG. 3 is a circuit schematic of an example of a sample/hold clock as may be used in a drive circuit such as that of FIG. 2.

FIG. 3 illustrates an example of a sample/hold clock 33 as may be used in circuits such as that of FIG. 2. The particular form of the clock 33 is generally in accordance with known sample/hold clock techniques. One input to a NOR gate 70 has a resistor R and capacitor C in an R-C network 76 that determines the pulse width of clock pulses generated by clock 33. Inverter stages 71, 72, 73 and 74 occur in the example clock 33. A first inverter 71 receives an input from the PWM clock (34 of FIG. 2) and supplies an output directly to input A of the NOR gate 70 and through a second inverter 72 to the R-C network 76 at the input B of the NOR gate. The gate output has two inverters 73 and 74 in series to a first clock output terminal with the second clock output terminal connected between those two inverters.

It can be seen that the R-C network 76 in clock 33 can have a very brief time constant in comparison with a full PWM ON time. Most motor coils 12 of interest characteristically have a time constant (coil inductance divided by coil resistance) of approximately 0.3 to 3.0 milliseconds. That is relatively long compared to one ON phase of PWM operation which is typically about 20 microseconds or less. The sample time may be an order of magnitude less than the PWM ON time. The coil current rising during the brief ON phase is substantially linear. Therefore, the middle point of the voltage sensed by resistor 22 is very close to the average value for that ON phase. Accordingly, the invention provides a way to obtain consistently accurate readings of the average coil current at all times.

Figure 4:
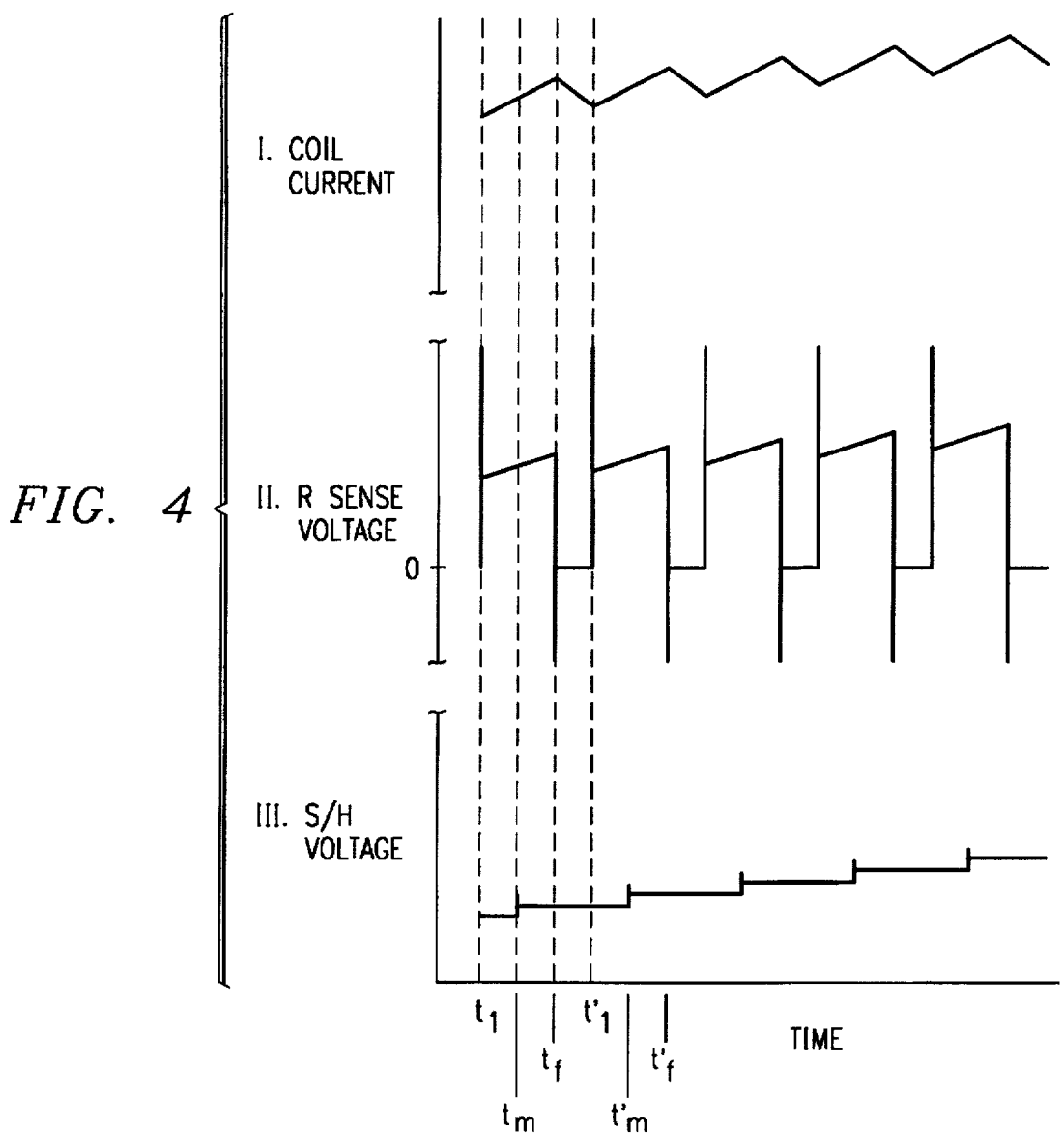
FIG. 4 combines waveforms illustrating, over time, variations in I. coil current, II. voltage in the sense resistor, and III. voltage available to the feedback loop resulting from application of the sample/hold technique of the present invention.

The waveforms of FIG. 4 further illustrate the operation and benefits of the invention.

FIG. 4 shows, in the top waveform I, actual coil current magnitude in relation to time. It has a substantially sawtooth form in which current rises for a time period from initiation of a PWM drive pulse ($t_1$) to termination of the pulse ($t_f$) and declines until the next such time period. (The gradual rise in coil current over the illustrated time encompassing five PWM ON phases is incidental to PWM motor drive operation and the voltages in the other waveforms reflect that).

The second or middle waveform II in FIG. 4 shows the voltage across the sense resistor 22. It exhibits a substantially linear rise during the ON time of rising coil current between $t_1$ and $t_f$. However, at the end of a pulse, at $t_f$ there is an abrupt negative spike before stability at about zero. When the next pulse is initiated, at $t'_1$, there is an abrupt positive spike before resuming a linear form again.

The voltage appearing as in the second waveform is not a good indication of actual coil current and therefore not a signal desirably supplied to the feedback control loop 24.

With the sample and hold technique of the present invention, the sense voltage occurring at the input of the sense amplifier has the appearance of that in the third, bottom, waveform III. The sampling occurs at the middle, $t_m$, of a rise in coil current with a minor positive pulse during the actual sample time after which the voltage remains substantially stable until the next sampling at a time $t'_m$ at the middle of the next coil current rise.

From the foregoing description, it is seen that sensing average coil current, which is important for control purposes, can be readily achieved without substantial complication or expense. The lower degree of noise produced in circuits in accordance with the invention is favorable compared to the higher noise occurrence, and hence instability, that can occur with a low pass filter in the feedback loop. Any noise resulting during use of the invention can be readily compensated for.

To again summarize some of the main concepts of the invention, a voltage signal corresponding to motor coil current is taken, for use by the feedback control circuit, only as samples at times that do not include transients at the beginning or the end of a PWM ON pulse. Desirably, the sampled signal is stored to be available to the feedback circuit at other times as well. It is preferred that the samples be taken substantially at the middle of coil current rise during a PWM ON pulse to make the sampled signal proportional to average coil current during the PWM ON pulse during which it is taken.

The essential concepts of the invention may be implemented in a variety of forms and manners other than as specifically described by way of example herein. While the invention may be implemented in either discrete or integrated form, it is advantageous that the elements needed for practice of the invention that are additional to those otherwise conventionally present in a PWM drive can be readily integrated with the normally present elements.

What is claimed is:

1. A circuit for providing a signal proportional to the average current flowing through coils of a motor operated in a PWM control mode, comprising:
   a sense resistor across which a voltage representing drive current supplied to the coils is developed;
   a sense amplifier having an input and an output;
   a signal storage capacitor connected in parallel with the sense resistor and connected to the input of the sense amplifier;
   a sample-hold switch connected between the sense resistor and the signal storage capacitor for (a) connecting the sense amplifier and the signal storage capacitor with the sense resistor at times $t_m$ mid-way between times $t_1$ of initiation of PWM drive pulses to the coils and times $t_2$ of termination of PWM drive pulses to the coils, when voltage developed across the sense resistor is at a middle value representing average coil current for a PWM drive pulse, and (b) disconnecting the sense amplifier and the signal storage capacitor from the sense resistor at other times, whereby the sense amplifier is provided a signal substantially proportional to the coil current during operation in the PWM control mode.

2. A circuit in accordance with claim 1 further comprising:
   circuitry for applying signals in accordance with PWM signals to the sample-hold switch to enable conduction from the sense resistor to the signal storage capacitor at said times $t_m$.

3. A circuit in accordance with claim 2 wherein:
   said circuitry comprises a sample-hold clock generator including means for establishing a sample time substantially at said times $t_m$ that is short in relation to full pulse on time $t_2-t_1$.

4. A circuit in accordance with claim 1 further comprising:
   means for switchably providing driving current to motor coils in accordance with PWM drive signals, said means including a plurality of switching transistors of which at least one of said switching transistors connected between a motor coil and the sense resistor is characterized by presenting accurate coil current to the sense resistor at said times $t_m$ and presenting inaccurate coil current to the sense resistor at certain times of PWM operation which are other than said times $t_m$.

5. A circuit in accordance with claim 1 wherein:
   the motor coils are coils of a three phase, direct current, motor connected in a Y configuration;
   and further comprising means for providing pulse width modulated (PWM) driving current to said coils comprising a bridge having three series current paths between a source of DC voltage and ground, each of said series current paths including the sense resistor and also including upper and lower switching transistors of which said lower switching transistors are connected between respective coils and the sense resistor; said lower switching transistors being characterized by presenting current to the sense resistor at times $t_m$ that is consistent with coil current and presenting current to the sense resistor at certain times other than $t_m$ that is not consistent with coil current.

6. A circuit in accordance with claim 5 wherein:
   said lower switching transistors are D-MOS type transistors that are characterized by having an intrinsic diode to ground that affects current presented to the sense amplifier at said certain times other than times $t_m$.

7. A motor control system providing average motor coil current sensing throughout operation in a drive mode that provides discontinuous coil energization, comprising:
   a drive circuit for supplying energizing current to motor coils in pulses;
   a current sensing and feedback circuit, for providing to the drive circuit a signal representing average current in the motor coils both during and between drive pulses, comprising:
      means for sampling and storing a signal representing coil current during drive pulses, and
      means for providing a feedback signal, proportional to the stored signal, to the drive circuit during operation between pulses.

8. A motor control system in accordance with claim 7 wherein:
   said drive circuit provides pulse width modulation (PWM) pulses to the motor coil through a transistor switching bridge;
   said current sensing and feedback circuit further includes a sense resistor connected with the transistor switching bridge and the means for sampling and storing a signal includes a sample-hold switch energized by a clock to close during a drive pulse for a time that is short compared to the pulse duration and further including a capacitive element for receiving and storing the signal representing the coil current at the time the sample-hold switch is energized.

9. A motor control system in accordance with claim 8 wherein:
   the transistor switching bridge of the drive circuit comprises upper transistors and lower transistors whose intermediate points are connected with motor coils and during drive pulses an excitation current is supplied through one of the upper transistors to one or more motor coils and from the coils through one of the lower transistors to the current sensing and feedback circuit.

10. A motor control system in accordance with claim 9 wherein:
   the lower transistors of the transistor switching bridge are of a construction that is subject, at times when the sample-hold switch is open, to conduction through an intrinsic diode to ground that prevents the sense resistor from receiving coil current.

11. Apparatus incorporating a motor control system in accordance with claim 7 wherein:
   the motor coils are stator coils of a brushless DC motor connected in a Y configuration and the motor is part of a computer disk drive.

12. A method of operating a PWM drive system for deriving average load current for control purposes throughout operation, both during and between drive pulses, comprising:
   sensing and developing a signal proportional to load current;
   sampling the signal proportional to load current at a time during a PWM drive pulse, other than a time of pulse initialization or termination, to derive a sampled current signal, wherein the time of the sampling is substantially at the average of load current during the PWM drive pulse and the sampled current signal is an average current signal; and applying the sampled current signal as a feedback signal during PWM drive operation.

13. A method in accordance with claim 12 further comprising: holding the sampled current signal so it is available for applying as a feedback signal throughout operation until a further sampled current signal is taken.

14. A method in accordance with claim 13 wherein:

the sampling is performed for a time interval that is short compared to the duration of a pulse.

15. A method in accordance with claim 14 wherein:

the holding of the sampled current signal is performed by charging a signal storage capacitor that substantially maintains its charge until a subsequent sampled current signal is taken.

16. A method in accordance with claim 12 wherein:

the sensing and developing of a signal proportional to load current is performed by sensing and developing a signal proportional to current through coils of a motor subject to PWM drive.

17. A drive system providing drive pulses for a load comprising:

means for sensing and developing a signal proportional to load current;

means for sampling the signal proportional to load current at a time during a drive pulse to derive a sampled current signal;

means for applying the sampled current signal as a control feedback signal means for holding the sampled current signal so it is available for applying as a feedback signal throughout operation until a further sampled signal is taken, and wherein the time at which the means for sampling samples the signal proportional to load current is substantially at an average of load current during a drive pulse and the sampled current signal is an average current signal;

the sampling time of the means for sampling is limited to a time interval that is short compared to a duration of a drive pulse, and the means for holding includes a signal storage capacitor that substantially maintains its charge until a subsequent sampled current signal is taken.

18. A drive system in accordance with claim 17 wherein:

the load is a motor for a data storage medium and the load current is coil current of the motor.

* * * * *